Sept. 2, 1930.  L. P. MOOERS  1,774,657
BRAKE ACTUATING MECHANISM
Filed Sept. 15, 1928  2 Sheets-Sheet 1

INVENTOR.
Louis P. Mooers
BY Fay, Oberlin & Fay
ATTORNEYS.

Sept. 2, 1930.  L. P. MOOERS  1,774,657
BRAKE ACTUATING MECHANISM
Filed Sept. 15, 1928  2 Sheets-Sheet 2

INVENTOR.
Louis P. Mooers
BY
Fay, Oberlin & Fay
ATTORNEYS.

Patented Sept. 2, 1930

1,774,657

UNITED STATES PATENT OFFICE

LOUIS P. MOOERS, OF CLEVELAND, OHIO, ASSIGNOR TO THE COLUMBIA AXLE COMPANY, OF CLEVELAND, OHIO, A CORPORATION OF OHIO

BRAKE-ACTUATING MECHANISM

Application filed September 15, 1928. Serial No. 306,131.

The present invention relates, as indicated, to a brake actuating mechanism, and more particularly to a novel actuating shaft and cam. The primary object of the invention is to provide a device of the class described which shall be extremely inexpensive to manufacture and remarkably free from disorders. Other objects of the invention will appear as the description proceeds.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

In said annexed drawing:—

Figure 1:
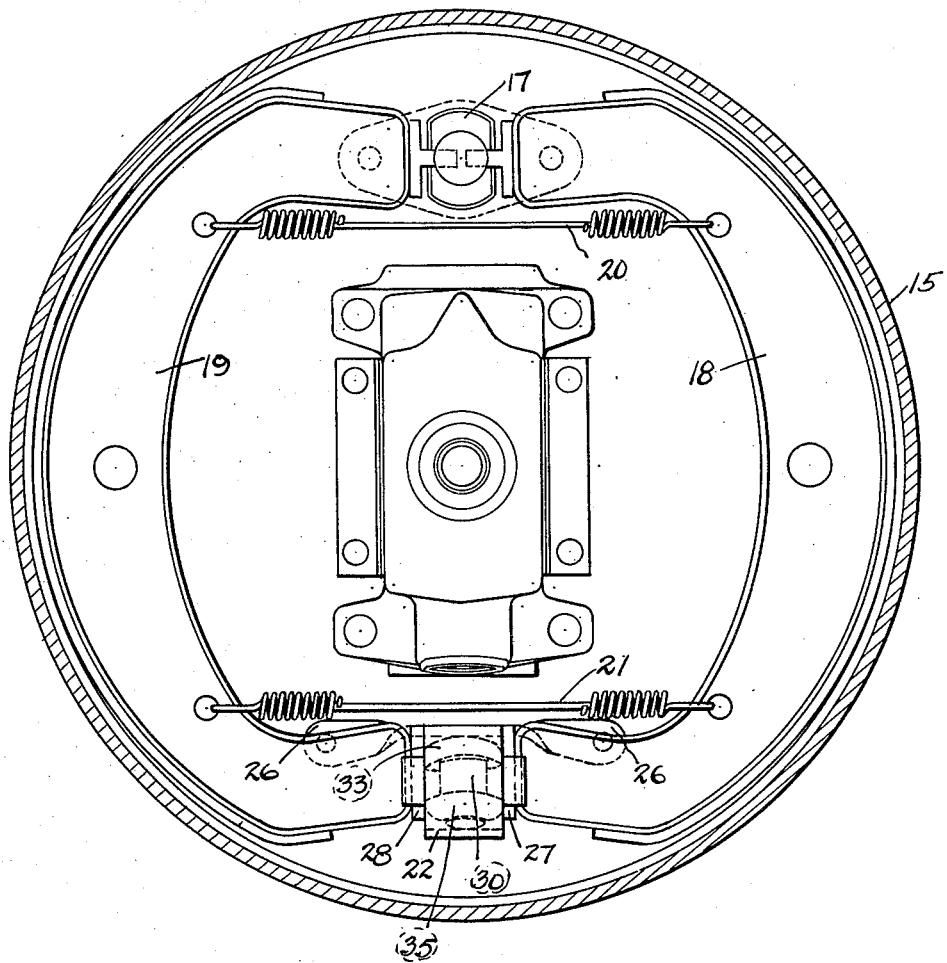
Figure 2:
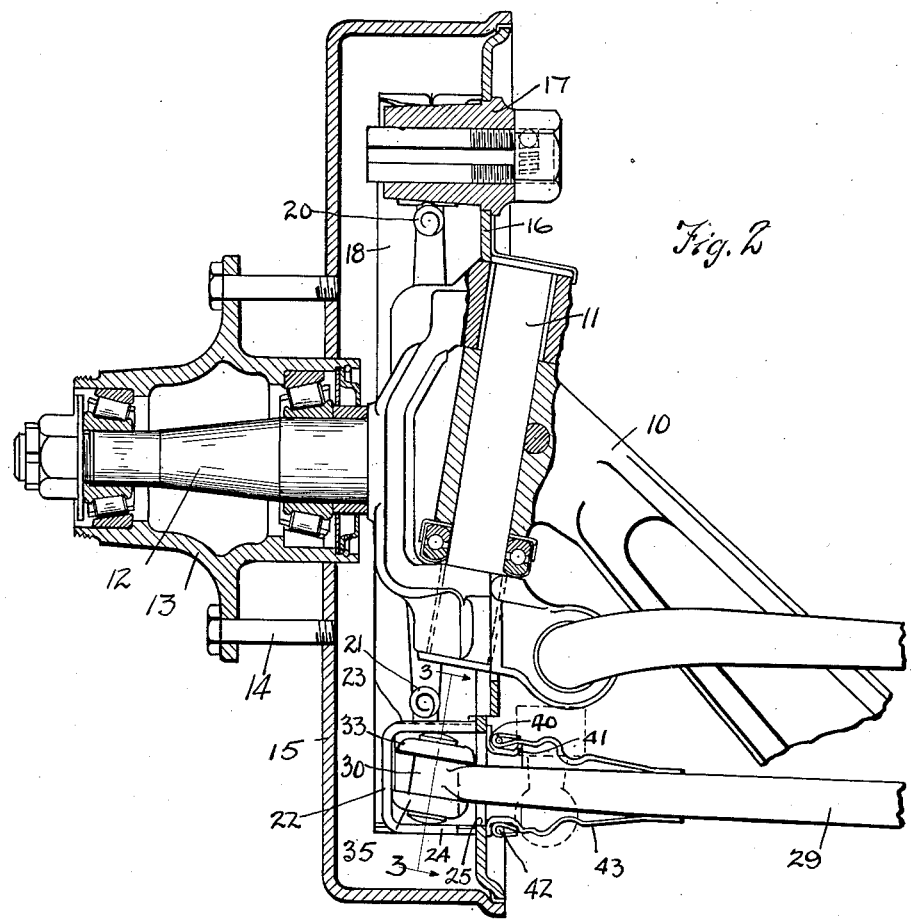

Fig. 1 is an elevational view of a brake mechanism including my improved operating cam; Fig. 2 is a substantially central longitudinal section therethrough; and Fig. 3 is an enlarged sectional view taken substantially upon the line 3—3 of Fig. 2 and looking in the direction of the arrows.

Referring more particularly to the drawings, the reference numeral 10 indicates the usual front axle of an automotive vehicle to which is secured, by means of a king pin 11, a stub axle 12 having rotatably mounted thereon a hub 13. Bolts 14 are provided for securing a brake drum 15 to said hub 13 and for clamping a wheel (not shown) between said hub and said brake drum. A dust shield 16 is carried by the knuckle of said axle 12, and substantially closes the inner open side of said brake drum 15. Within a suitably formed aperture in the upper portion of said dust shield 16 there is mounted an element 17 with which are engaged the upper ends of the brake shoes 18 and 19. Said element 17 is adapted to adjust the normal distance between the said ends of said brake shoes, but such element forms no part of the present invention, and will not here be described in detail. The element 17 is fully disclosed in my copending application Ser. No. 303,292, filed August 31, 1928.

A resilient member 20 has its ends secured to the upper ends of the brake shoes 18 and 19, and said member urges said brake shoe ends toward each other. A similar member 21 is secured at its ends to the lower ends of said brake shoes, and said member 21 urges said lower ends into contact with the sides of a U-shaped frame 22 secured to said dust shield adjacent the lower portion thereof. The legs 23 and 24 of said U-shaped frame are disposed in substantial vertical alignment, and the open end of said frame registers with an aperture 25 formed in said dust shield 16.

Figure 3:
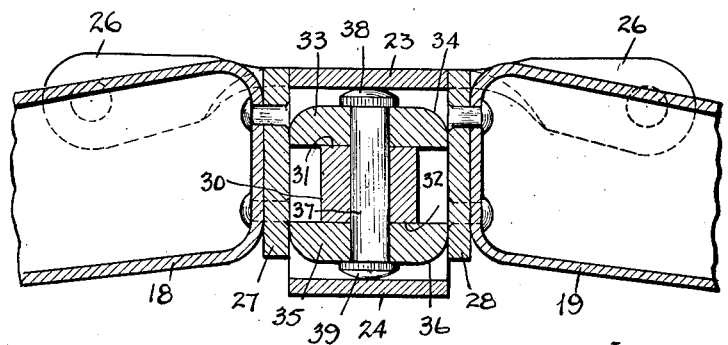

As is clearly shown in Figs. 1 and 3, said frame 22 is provided with a pair of oppositely extending ears 26, through which the same is secured to the dust shield 16. A wear plate 27 is secured to the end of the shoe 18 and is adapted to contact with said frame, and a wear plate 28 is secured to the corresponding end of the shoe 19.

According to the present invention, a brake actuating shaft 29 is formed at its one end 30 with a pair of parallel plane surfaces 31 and 32 (see Fig. 3). A disk-like member 33 having rounded upper edges 34 and having a diameter substantially equal to the axial width of the frame 22 is mounted on said plane surface 31. A similar member 35 having rounded edges 36 is similarly mounted on the plane surface 32. In the illustrated embodiment, said members 33 and 35 are secured in place by means of a pin or rivet 37 having its one end 38 headed down over the member 33 and its opposite end 39 headed down over the member 35. It will be clear that the specific construction just described might be varied in numerous ways without departing from the scope of the present invention. The essential feature is that the securing means shall be of such length that opposite ends thereof shall contact, in the release position, the respective legs of the U-shaped member 22, whereby the shaft-end 30 is steadied in position against undue rattling.

A bracket 40 is preferably secured to the outside face of the dust shield 16, and said bracket is formed with a flange 41. A spring ring 42 serves to hold in engagement with said bracket a boot 43 of leather or other flexible material to exclude foreign matter from the interior of the brake drum.

It will be readily seen that, as the shaft 29 is rotated or oscillated, the rounded edges 34 and 36 of the members 33 and 35, respectively, cam around in engagement with the wear plates 27 and 28 to separate the same to move the brake shoes 18 and 19 into braking engagement with the internal surface of the brake drum 15.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In mechanism of the class described, a brake drum, a pair of shoes mounted in said drum and normally spaced therefrom, and means for moving said shoes outwardly into braking engagement with said drum comprising a frame interposed between the free ends of said shoes, a shaft substantially paraxial with said drum and having an end floatably mounted in said frame, and a cam rigid on said end of said shaft and received in said frame.

2. In mechanism of the class described, a brake drum, a pair of shoes mounted in said drum and normally spaced therefrom, and means for moving said shoes outwardly into braking engagement with said drum comprising a U-shaped frame having its legs substantially in vertical alignment interposed between the free ends of said shoes, a shaft substantially paraxial with said drum and having an end floatably mounted in said frame, and a cam rigid on said end of said shaft and received in said frame.

3. In mechanism of the class described, a brake drum, a pair of shoes mounted in said drum and normally spaced therefrom, and means for moving said shoes outwardly into braking engagement with said drum comprising a shaft substantially paraxial with said drum and having its one end formed with a pair of parallel plane surfaces, said end being interposed between the free ends of said shoes, and a pair of disk-like members secured to said surfaces, respectively.

4. In mechanism of the class described, a brake drum, a pair of shoes mounted in said drum and normally spaced therefrom, and means for moving said shoes outwardly into braking engagement with said drum comprising a shaft substantially paraxial with said drum and having its one end formed with a pair of parallel plane surfaces, said end being floatably interposed between the free ends of said shoes, and a pair of disk-like members correspondingly mounted on said surfaces, respectively, means securing said disk-like members to said shaft surfaces, and means cooperating with said last-named means for normally holding said shaft-end in position.

5. In mechanism of the class described, a brake drum, a pair of shoes mounted in said drum and normally spaced therefrom, and means for moving said shoes outwardly into braking engagement with said drum comprising a shaft substantially paraxial with said drum and having its one end formed with a pair of parallel plane surfaces, said end being floatably interposed between the free ends of said shoes, a pair of disk-like members correspondingly mounted on said surfaces, respectively, a pin securing both of said disk-like members to said shaft surfaces, and means normally engaging the ends of said pin to hold said shaft end in position.

6. As a new article of manufacture, a brake actuating shaft having a plane surface formed on its one end, a disk-like member mounted on said surface, and means securing said member to said shaft and extending beyond the free face of said member.

7. As a new article of manufacture, a brake actuating shaft having a pair of parallel plane surfaces formed on its one end, a pair of duplicate disk-like members mounted on said surfaces, respectively, and means securing said members to said shaft and extending beyond the free faces of said disk-like members.

8. As a new article of manufacture, a brake actuating shaft having a pair of parallel plane surfaces formed on its one end, a pair of duplicate disk-like members mounted on said surfaces, respectively, and a pin having its axis substantially perpendicular to said plane surfaces and securing said members to said shaft end, each end of said pin extending beyond the free face of one of said disk-like members.

Signed by me, this 12th day of Sept., 1928.

LOUIS P. MOOERS.